United States Patent [19]

Moore et al.

[11] Patent Number: 4,918,826
[45] Date of Patent: Apr. 24, 1990

[54] INDEX TABLE AND METHOD OF ALIGNMENT

[75] Inventors: Bruce L. Moore, Farmington Hills; Graham D. Cottam, Novi, both of Mich.

[73] Assignee: H. R. Krueger Machine Tool Inc., Farmington, Mich.

[21] Appl. No.: 238,324

[22] Filed: Aug. 30, 1988

[51] Int. Cl.⁵ ............................................. G01B 5/25
[52] U.S. Cl. ...................................... 33/645; 409/221
[58] Field of Search ................ 33/645, 623, 568, 569, 33/570, 644; 269/66; 409/221

[56] References Cited

U.S. PATENT DOCUMENTS

| | | | |
|---|---|---|---|
| 2,965,208 | 12/1960 | Forster et al. | 409/221 |
| 3,336,823 | 8/1967 | Bonzi | 409/221 |
| 3,994,100 | 11/1976 | Shelden et al. | 51/145 T |
| 4,049,252 | 9/1977 | Bell | 269/57 |
| 4,196,522 | 4/1980 | Bell et al. | 33/623 |
| 4,200,182 | 4/1980 | Siarto | 409/221 |
| 4,288,180 | 9/1981 | Trevarrow | 33/552 |
| 4,332,089 | 6/1982 | Denning | 33/623 |
| 4,444,534 | 4/1984 | Bergman | 409/221 |
| 4,571,148 | 2/1986 | Drazan | 33/645 |

Primary Examiner—William A. Cuchlinski, Jr.
Assistant Examiner—Christopher W. Fulton
Attorney, Agent, or Firm—Harness, Dickey & Pierce

[57] ABSTRACT

An index table utilizing eccentric pins for the accurate alignment thereof, and a method of alignment using a laser tarnsmitter/receiver and optical prism.

3 Claims, 3 Drawing Sheets

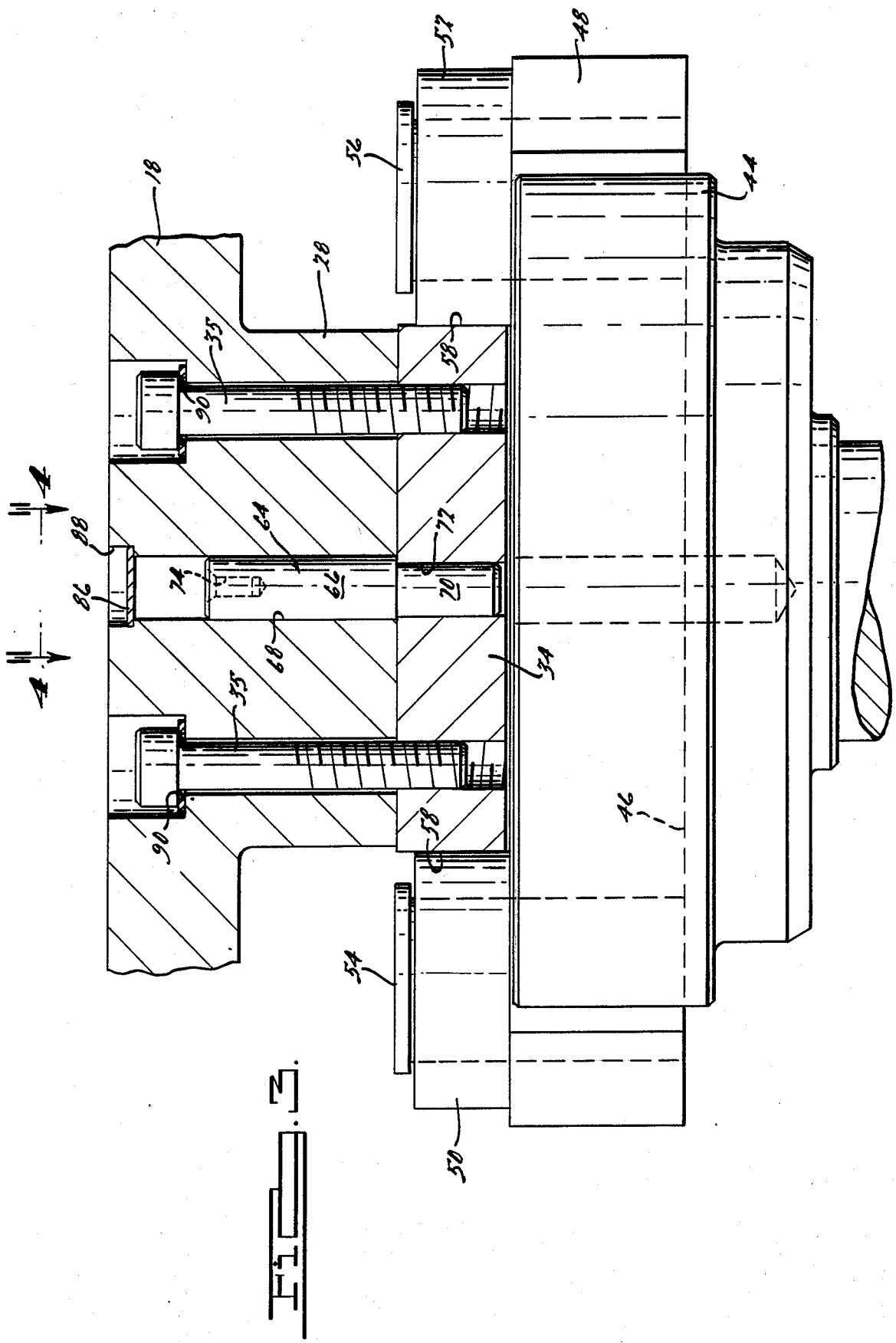

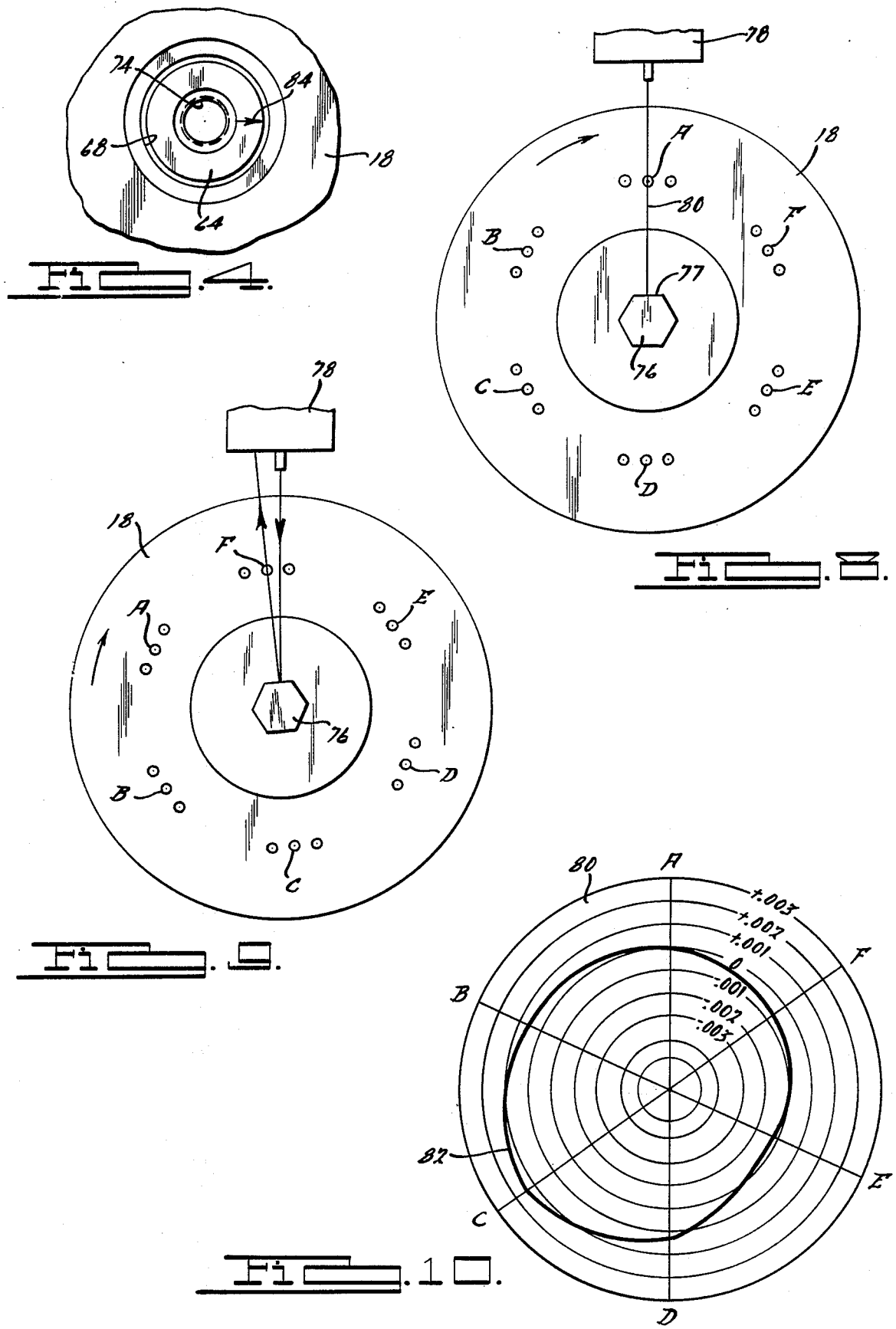

INDEX TABLE AND METHOD OF ALIGNMENT

BACKGROUND AND SUMMARY OF THE INVENTION

This invention relates to indexing apparatus, and more particularly to a geneva index positioned dial index table of superior accuracy, as well as to a unique method of aligning same.

Index tables for holding workpiece fixtures and indexing them past sequential machinery operations must be capable of accurately positioning each station thereon in the exact angular location the machining apparatus expects to find it. If this does not occur, inaccurate machining may result. Achieving this increasing need for accuracy has become very difficult, especially in the larger index tables, such as those up to seven feet or more in diameter. Traditionally it has been very hard to avoid accumulating angular errors in the gauging and aligning such equipment. Furthermore, many such alignment techniques require at least partial disassembly of the machine (such as removal of the index table), and often subsequent reassembly introduces new errors into the machine.

It is therefore an object of the present invention to provide an improved index table which is capable of being very simply aligned with extreme accuracy, as well as a method of achieving this accuracy using a laser transmitter/receiver and a gauging prism, in combination with eccentric locating pins. While it has been known to use laser equipment and eccentric pins, the present invention is unique in that it can be practiced with the machine in fully assembled running condition, using the actual machine drive, thus avoiding the possibility of introducing additional errors or inaccuracies into the machine during disassembly and reassembly. The result is much greater accuracy than could be machined into the index table, e.g. less than 0.001" cumulative deviation around the entire periphery of the table.

DESCRIPTION OF THE DRAWINGS

FIG. 3 is an enlarged fragmentary vertical sectional view taken in a plane perpendicular to a radial plane through the center of the machine and passing through the vertical axis of rotation of the indexing drive, showing how the lock plates are mounted and interface with the indexing drive;

FIG. 4 is a fragmentary top plan view taken generally from line 4—4 in FIG. 3, with the plug removed;

FIGS. 8 and 9 are diagrammatic top plan views of the indexing table showing the method of aligning same, assuming for illustrative purposes that there are six stations; and FIG. 10 is a representative polar graph showing how the alignment data is utilized.

DETAILED DESCRIPTION OF THE INVENTION

Figure 1:
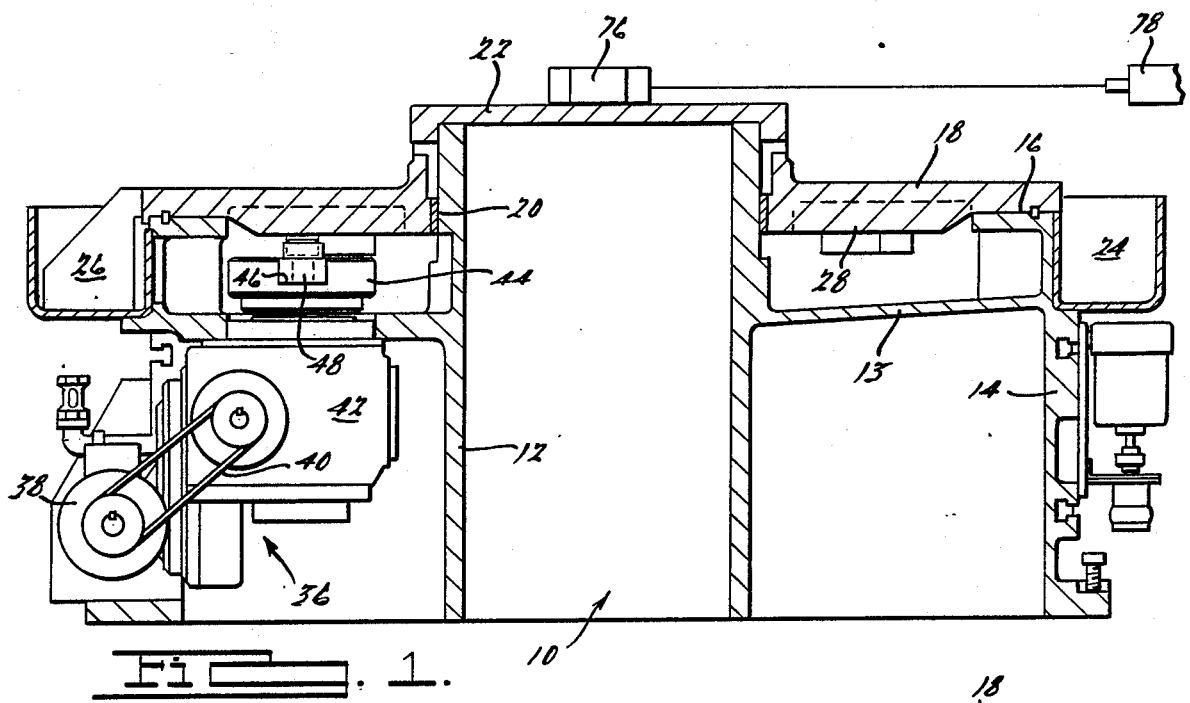
FIG. 1 is a simplified vertical sectional view through the center of a dial index table machine embodying the principles of the present invention.

Although the structure and method of the present invention are applicable to many different types of indexing equipment, for illustrative purposes they are disclosed embodied in a dial index table apparatus of the type used in machine tools for high production. With reference to FIG. 1 the relevant portions of the machine comprise a generally circular (in plan) stationary base 10 including a core 12 connected by an annular web 13 to an outer peripheral wall 14 having an annular upwardly facing hydrostatic thrust bearing 16 on which is rotationally disposed a circular index table top 18, which is also journalled to core 12 at 20. A cover 22 encloses the top of core 12 and a chip trough 24, cooperating with a chip paddle 26, surrounds table 18 and is affixed to wall 14.

Figure 2:
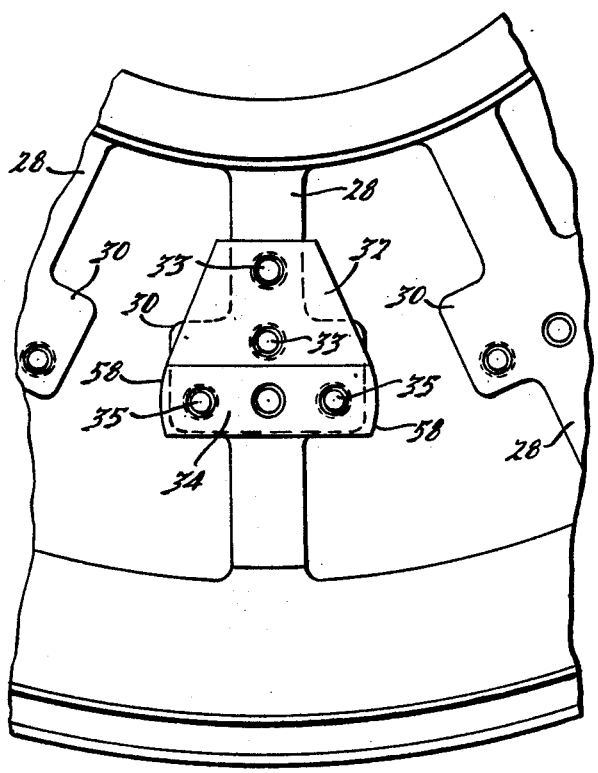
FIG. 2 is an enlarged fragmentary bottom plan view of a portion of the table top of the machine of FIG. 1, showing the geneva and lock plates.

The underside of table 18 is provided with a plurality of radially extending ribs 28, one for each workstation which may be provided on the machine, each having a widened portion defining a mounting pad 30 (FIG. 2). On each pad corresponding to a workstation there is affixed a geneva plate 32 and a lock plate 34, each of the configuration shown. Geneva plates 32 are bolted to table 18 from the top by bolts 33, and lock plates 34 similarly by bolts 35.

Table 18 is indexed from work position to work position by means of a drive unit 36 comprising a motor 38 drivingly connected by means of a drive belt 40 to a speed reducer 42 having a vertical output shaft 44 having a diametrical slot 46 across the upper face thereof in which is rigidly disposed an index bar 48 having on the upper surface thereof adjacent each end index rollers 50 and 52 rotatably mounted by means of headed index pins 54 and 56, respectively. Rollers 50 and 52 are spaced so that each lock plate 34 is tightly squeezed therebetween to positively locate the table in each station position.

Figure 5:
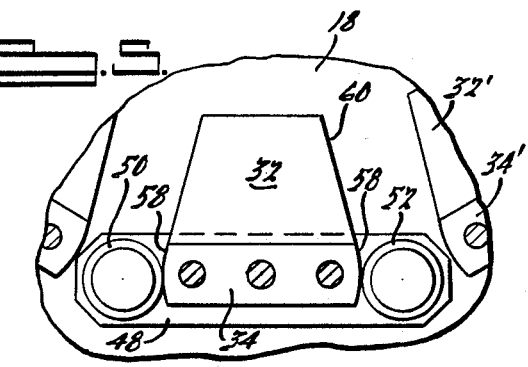
FIGS. 5, 6 and 7 are diagrammatic plan views of the geneva indexing mechanism of the machine of FIG. 1 showing its sequence of operation.
Figure 6:
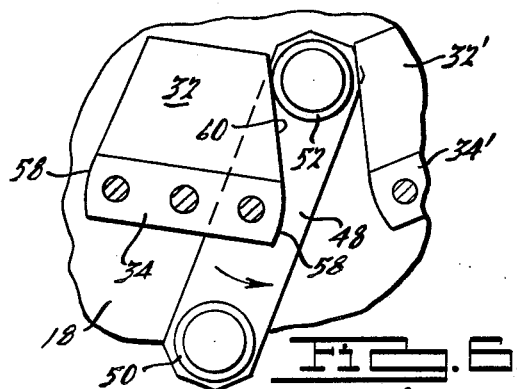
Figure 7:
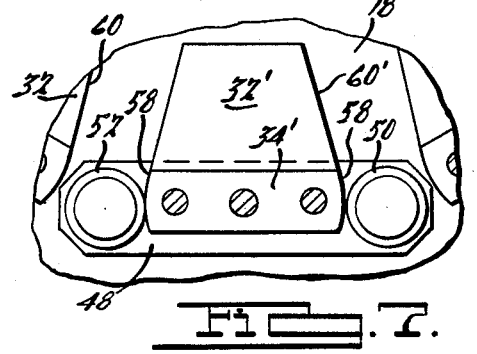

The manner in which drive unit 36 causes table 18 to index is best shown diagrammatically in FIGS. 5–7. When the machine is in its locked position shown in FIG. 5 the index rollers firmly engage ends 58 of lock plate 34, each end 58 being of circular cylindrical configuration centered on the axis of rotation of shaft 44 so that the exact rotational position of index bar 48 does not effect the position of table 18 when the drive is deenergized. Energization of drive unit 36 causes index bar 48 to rotate as shown in FIG. 6 and roller 52 drivingly engages the usual contoured surface 60 on the side of geneva plate 32 to cause table 18 to rotate. Index bar 48 rotates until the position shown in FIG. 7 in which table 18 has rotated to the next station and the next lock plate, indicated at 34', has been fully engaged by rollers 50 and 52.

As can be appreciated, each of the lock plates must be extremely accurately located with respect to one another and table 18 in order to provide extremely precise indexing. It is the structure for, and the method of, positioning the locking plates on the table in an extremely accurate fashion which forms the subject matter of the present invention. Except for the fact that bolts 33 and 35 are accessible from the top of table 18, the entire apparatus thus far described in detail is known in the art and may be designed and manufactured using conventional practices.

The present invention may be best understood with reference to FIGS. 3, 4 and 8–10. Applicants have discovered that by locating bolts 35 so they are accessible from the top of table 18, and providing means for accurately adjusting and fixing the angular (circumferential) position of lock plates 34 using laser angle measuring equipment, superior accuracy in the positioning of each work station on the table may be achieved, with a resultant increase in accuracy in the ultimate machining operation performed on the table by the machine user.

In accordance with the present invention, initial alignment of lock plates 34 (which determine ultimate table station position) is accomplished at each station by a master pin 64 having a first diameter portion 66 press fit into a bore 68 in the table and a smaller second diameter portion 70 press fit into a bore 72 in each lock plate 34 (FIG. 3). As can be seen, pin 64 can be inserted and removed (using a puller connected to the pins by a threaded hole 74) from the top of the table after the machine is fully assembled, as can bolts 35. As defined herein, a master pin is an "eccentric" dual diameter pin in which the two diameters are concentric, i.e., zero eccentricity.

Thus assembled, the machine is aligned in the following manner. An extremely accurate, gauge quality certified optical polygonal prism 76 (such as a Webber optical polygon offered by Starrett in Athol, Mass. 01331) is temporarily mounted to the top of cover 22 in the center of rotation of table 18, the prism having a number of exactly equally spaced flat facets equal to the number of work stations. The prism is orientated so that one facet, indicated at 77 in FIG. 8, is disposed in a plane approximately perpendicular to a radius from the axis of rotation of the table through the first station measured, which becomes the reference station, indicated at A in FIG. 8. A laser transmitter/receiver 78 (such as a horizontal sweep laser model L-711 and single axis sweep target model A-517 offered by Hamer Laser Instruments, Inc. in Wilton, Conn. 06897) is positioned at the level of prism 76 and aimed so that the beam 80 therefrom hits facet 77 and is reflected back to transmitter/receiver 78 with a reading zero degrees deflection, with the beam passing over the approximate center of pin 64 at station A (FIGS. 1 and 8). Transmitter/receiver 78 has the usual receiver which accurately displays the linear displacement of the reflected beam from the transmitted beam. This establishes the reference point for establishing the angularity of all the other stations.

Drive unit 36 is then energized, without moving transmitter/receiver 78, and table 18 indexed to station B as it would be in normal operation (FIG. 9) and another reading is taken. Assuming lock plate 34 for station B is not perfectly angularly aligned, prism 76 will reflect the beam back to transmitter/receiver 78 with the linear deflection greater or less than zero degrees, as shown in a very exaggerated manner in FIG. 9. This distance of deflection, and its direction of deviation, is recorded. This process is repeated for every station, using the indexing drive mechanism of the machine, for a statistically significant number of times (which could be 50 or more times). The resultant data, which is the error distance for each station each pass, is then processed using standard trigometric calculations, knowing the distance of each pin 64 and transmitter/receiver 78 from the center of the machine, to determine the mean angular and linear offset of each station. This linear offset is then plotted in the form of a polar chart 80, such as shown in FIG. 10, wherein curve 82 is a plot of the mean data, the concentric reference lines represent the amount of linear (distance) deviation each pin 64 is from where it should be, and the radial "axes" marked A–F represent each station. The point on each of the radial lines where curve 82 crosses the represents the linear deviation of the pin 64 for that particular station, which can be read from the circular lines. Because station A is the reference station in this example, its deviation is zero, the sign of the deviation numbers indicating whether they are in a leading direction or a lagging direction.

The machine is then finally aligned by grinding a new pin 64 for each station B through F having the amount of offset or eccentricity required to correct the deviation set forth in the chart. The direction of offset of each pin is marked on the end thereof using an arrow 84 (FIG. 4). At each station to be changed, and without disassembling the machine (which would introduce new errors), bolts 35 are loosened, master pin 64 is removed using a puller in hole 74, the new specially ground eccentric pin is press fit in place using arrow 84 for proper alignment, and bolts 35 (which are in oversize bores to facilitate realignment) retightened. The gauging process can then be repeated if necessary or desired to make sure the machine indexes to the precise location desired. Ultimately, one or all of the pins may be replaced, and some more than once, to get the desired result, but with this technique the final accuracy obtained is significantly better than that conventionally achieved. The prism and transmitter/receiver are then removed and the machine is ready for use. A welsh plug 86 is inserted in a counter bore 88 to pevent cooling and lubricating liquid, etc. from contaminating the aligning mechanism. The heads of bolts 35 may be provided with elastomeric seals 90 for the same purpose.

While it is apparent that the preferred embodiments of the invention disclosed above are well calculated to achieve the objects of the present invention, it will be appreciated that the invention is susceptible to modification, variation and change without departing from the proper scope or fair meaning of the subjoined claims.

We claim:

1. A method of accurately aligning a fully assembled powered index table mounted on a base and having a predetermined number of stations about the periphery thereof, a drive means, a lock means for each station and an eccentric pin for locating each lock means relative to the table, the method comprising the steps of:
   (a) measuring the linear deviation of each station from the desired precise location thereof;
   (b) fabricating a new eccentric pin for each station having an eccentricity chosen to eliminate said deviation at said station; and
   (c) for each deviant station loosening said lock means, replacing the original eccentric pin with said new eccentric pin and retightening said lock means, without disassembling said table from said base.

2. A method as claimed in claim 1 wherein said lock means are loosened and retightened from the top of said table.

3. A method as claimed in claim 1 wherein said eccentric pins are removed and installed from the top of said table.

* * * * *